United States Patent [19]
Smith et al.

[11] Patent Number: 4,735,012
[45] Date of Patent: Apr. 5, 1988

[54] FISHING LURE

[76] Inventors: Raymond D. Smith, 307 E. Patrick St.; Gene V. Horner, 109 W. 4th St., both of Frederick, Md. 21701

[21] Appl. No.: 929,360

[22] Filed: Nov. 12, 1986

[51] Int. Cl.⁴ .............................................. A01K 85/00
[52] U.S. Cl. ................................... 43/42.12; 43/42.25; 43/42.51
[58] Field of Search ................... 43/42.25, 42.5, 42.51, 43/42.06, 42.12, 42.14, 42.16, 42.19, 42.2

[56] References Cited

U.S. PATENT DOCUMENTS

| | | | |
|---|---|---|---|
| 1,395,533 | 1/1921 | Tuttle | 43/42.25 |
| 2,002,117 | 5/1935 | Lavitt | 43/42.51 |
| 2,236,023 | 3/1941 | Turner | |
| 2,268,541 | 1/1942 | Arbogast | 43/42.25 |
| 2,551,127 | 5/1951 | Hesse | 43/42.2 |
| 2,562,743 | 7/1951 | Schindler | 43/42.5 |
| 3,165,854 | 1/1965 | Teetor | 43/42.51 |
| 3,260,011 | 7/1966 | Reamy | 43/42.12 |
| 3,439,443 | 4/1969 | Weimer | 43/42.12 |
| 4,435,914 | 3/1984 | Norman | |

FOREIGN PATENT DOCUMENTS

| | | | |
|---|---|---|---|
| 510423 | 3/1955 | Canada | 43/42.12 |
| 1061263 | 4/1954 | France | 43/42.12 |

Primary Examiner—Kurt Rowan
Attorney, Agent, or Firm—Shoemaker and Mattare, Ltd.

[57] ABSTRACT

An artificial lure includes a spoon body portion having a triangular opening within which a spirally fluted conical spinner is mounted for rotation on the longitudinal axis of the spinner and spoon body portion. The trailing end of the spoon body portion carries a deflector lip causing erratic movement of the lure in the water. The fishing line is attached to the forward end of the spoon body portion. A longitudinal extension of the spoon body portion on the deflector lip carries a skirt having a multitude of strands which substantially conceal a multi-barbed fish hook attached to the rear of the longitudinal extension.

4 Claims, 1 Drawing Sheet

U.S. Patent   Apr. 5, 1988   4,735,012
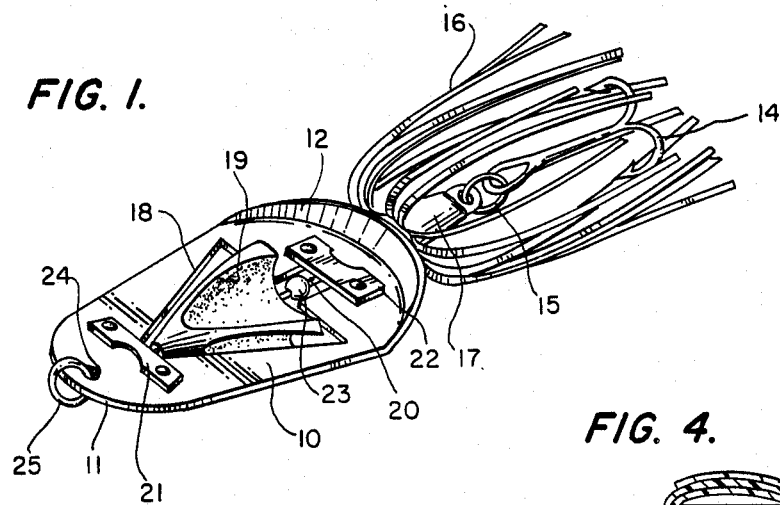
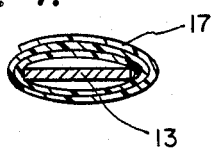
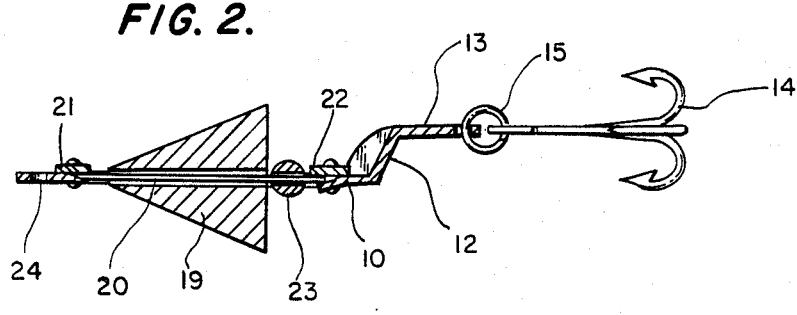
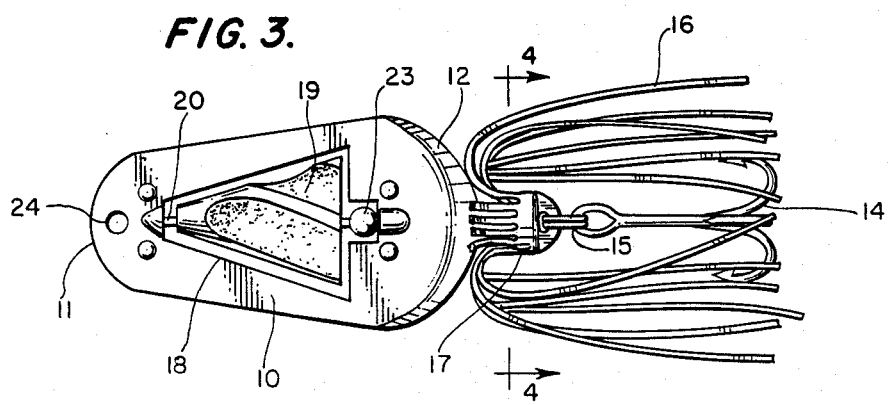

FISHING LURE

BACKGROUND OF THE INVENTION

Fishing lures having plate or spoon bodies equipped with spinners are known. Examples of such lures are shown in U.S. Pat. Nos. 2,236,023 and 4,435,914.

The primary object of this invention is to improve on the known prior art by providing an artificial lure having a spoon body portion on which a conically tapered spinner is rotatably mounted to more effectively attract fish. The spoon body portion is also equipped with a lip extending generally normal to the plane of the spoon body portion which causes the lure to move erratically in the water.

A further object of the invention is to provide a lure of greater simplicity and more practical and economical construction than the prior art.

Still another object of the invention is to provide a lure of the above-mentioned type in which a flexible multi-strand hook-concealing skirt is mounted directly on a rear extension arm of the spoon body portion.

Other objects and advantages of the invention will become apparent to those skilled in the art during the course of the following description.

BRIEF DESCRIPTION OF THE DRAWINGS

FIG. 1 is a perspective view of a fishing lure according to the present invention.

FIG. 2 is a central longitudinal vertical section taken through the lure of FIG. 1 with the flexible skirt omitted therefrom.

FIG. 3 is a bottom plan view of the lure as shown in FIG. 1.

FIG. 4 is an enlarged transverse vertical section taken on line 4—4 of FIG. 3, with parts omitted.

DETAILED DESCRIPTION

Referring to the drawings in detail wherein like numerals designate like parts, an artificial fishing lure is illustrated comprising a generally flat plate or spoon body portion 10 which is longitudinally tapered forwardly toward a leading arcuate end 11. The wider rear end of the spoon body portion 10 is also arcuate and an integral relatively shallow somewhat inclined arcuate deflector lip 12 is formed on the rear of the spoon body portion 10 to impart to the lure erratic movements as it is pulled through the water. The lip 12 extends generally normal to the plane occupied by the flat spoon body portion 10.

A rear narrow longitudinal extension arm 13 is carried by the lip 12 at the transverse center of the spoon body portion and extends rearwardly of the lip 12 in parallel relationship to the spoon body portion 10. A multi-barbed fish hook 14 is attached to the rear of the extension arm 13 by an attaching eye 15. A multi-strand flexible skirt 16 formed of rubber or the like includes a forward strip 17 which is wrapped around the extension arm 13 preferably in multiple wraps and suitably secured thereto. The trailing flexible strands of the skirt 16 partially conceal the hook 14 without blocking access thereto by a striking fish. This skirt 16 also gives a life-like appearance to the artificial lure.

In accordance with an important aspect of the invention, the spoon body portion 10 is provided centrally with a triangular opening 18 having its apex arranged forwardmost and its base rearmost. Within this triangular opening is disposed a conical forwardly tapering spirally fluted spinner 19 occupying substantially the entire space defined by the opening 18 and projecting equidistantly above and below the flat spoon body portion 10.

The spinner 19 is journaled for free rotation on its longitudinal axis by a rod or shaft 20 whose forward and rear ends are anchored to the spoon body portion 10 by clamp plates 21 and 22 or by other suitable means. The rod 20 lies in the flat plane occupied by the spoon body portion 10. A spacer bead 23 is preferably mounted on the rod 20 adjacent to the rear edge or base of the triangular opening 18 and between this base and the clamp plate 22 to keep the spinner 19 centrally located in the opening 18.

The forward extremity of the spoon body portion 10 has an aperture 24 receiving an eye 25, FIG. 1, by means of which a fishing line is attached to the artificial lure.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A fishing lure comprising:
   a spoon body portion having a triangular opening with the apex of the opening disposed forwardly on the spoon body portion,
   a conical spirally fluted spinner rotatably held in said triangular opening of the spoon body portion and projecting substantially equidistantly above and below the spoon body portion,
   trailing fish hook means on the rear of the spoon body portion,
   means on the front of the spoon body portion for attaching a fishing line thereto,
   a deflector lip on the rear of the spoon body portion and projecting beyond one side of a plane occupied by the spoon body portion for imparting erratic movements to the lure as it is being pulled through the water, and
   a rear longitudinal extension arm integral with the deflector lip substantially at the transverse center of the spoon body portion but offset therefrom, a fish hook attached to said extension arm, and a multi-strand flexible skirt including a forward strip portion wrapped around the extension arm and secured thereto with the strands of said skirt surrounding and somewhat concealing the fish hook.

2. A fishing lure as defined in claim 1, and the spoon body portion being generally flat and tapering longitudinally and having arcuate forward and rear ends, said deflector lip also being arcuate.

3. A fishing lure as defined in claim 1, and a longitudinal shaft fixed to the spoon body portion and extending through said triangular opening from the base to the apex thereof, and said conical spirally fluted spinner having a longitudinal bore receiving said shaft whereby the spinner is freely rotatable thereon.

4. A fishing lure as defined in claim 1, and said trailing fish hook means comprising a extension arm on the rear of the spoon body portion, a fish hook attached to the rear of said extension arm, and a flexible multi-strand skirt element attached to the extension arm with the strands thereof surrounding the fish hook.

* * * * *